(12) United States Patent
Dwivedi

(10) Patent No.: US 10,781,055 B1
(45) Date of Patent: Sep. 22, 2020

(54) SYSTEM AND METHOD FOR SEPARATING PACKAGES OF DIFFERENT SIZES

(71) Applicant: Siemens Postal, Parcel & Airport Logistics LLC, DFW Airport, TX (US)

(72) Inventor: Rajeev Dwivedi, Plano, TX (US)

(73) Assignee: Siemens Logistics LLC, DFW Airport, TX (US)

( * ) Notice: Subject to any disclaimer, the term of this patent is extended or adjusted under 35 U.S.C. 154(b) by 0 days.

(21) Appl. No.: 16/398,673

(22) Filed: Apr. 30, 2019

(51) Int. Cl.
*B65G 47/71* (2006.01)
*B07C 3/08* (2006.01)
*B07C 5/04* (2006.01)

(52) U.S. Cl.
CPC ............ *B65G 47/71* (2013.01); *B07C 3/08* (2013.01); *B07C 5/04* (2013.01); *B65H 2701/1916* (2013.01)

(58) Field of Classification Search
CPC ........ B65G 47/71; B65G 47/28; B65G 13/02; B65G 15/00; B07C 3/09; B07C 5/04; B07C 3/08; B07C 1/14; B07C 1/06; B23Q 7/12
USPC ......................................................... 198/442
See application file for complete search history.

(56) References Cited

U.S. PATENT DOCUMENTS

| | | | |
|---|---|---|---|
| 3,651,921 A * | 3/1972 | Hill .................... | B65G 47/1492 198/456 |
| 4,039,074 A | 8/1977 | Maxted | |
| 5,400,896 A | 3/1995 | Loomer | |
| 9,694,393 B2 | 7/2017 | Mueller et al. | |
| 2017/0173635 A1* | 6/2017 | Schroader .............. | B65G 47/44 |

FOREIGN PATENT DOCUMENTS

WO    WO-2020014027 A1 * 1/2020 ............. B65G 47/28

* cited by examiner

*Primary Examiner* — Gene O Crawford
*Assistant Examiner* — Lester Rushin, III

(57) ABSTRACT

A system for separating packages of different sizes includes a conveyor segment and a plurality of alignment members dividing the conveyor segment into a plurality of conveyor lanes. The conveyor segment has an input end, a discharge end and transport mechanism for transporting packages from the input end to the discharge end. The transport mechanism is configured to impart a lateral shift to packages on the conveyor segment. One or more of the alignment members each forms a respective window to allow lateral shifting of packages across adjacent conveyor lanes. Each window has a uniquely defined vertical height to the limit lateral shifting of packages across adjacent conveyor lanes based on a height of each package. Each conveyor lane delivers packages of a uniquely different size group at the discharge end of the conveyor segment. The packages in a conveyor lane are aligned against a respective alignment member.

12 Claims, 3 Drawing Sheets

SYSTEM AND METHOD FOR SEPARATING PACKAGES OF DIFFERENT SIZES

BACKGROUND

1. Field

The present disclosure relates to the field of mail and parcel processing, and in particular, to sorting of packages based on size.

2. Description of the Related Art

Parcel distribution centers typically receive large quantities of parcels or packages, often widely varying in size, that are unloaded en masse from trucks or other transportation media. The packages merge into a central area in a random order and orientation where they are oriented and aligned in a single file by singulators for further processing. The further processing may include, for example, scanning of destination-identifying bar codes and sortation to destination areas for loading onto trucks or other transportation media.

SUMMARY

Briefly, aspects of the present disclosure are directed to sorting of packages based on size using aligner based filtering.

According to a first aspect, a system is provided comprising a conveyor segment and a plurality of alignment members positioned along the conveyor segment, dividing the conveyor segment into a plurality of conveyor lanes. The conveyor segment has an input end and a discharge end and comprises transport mechanism for transporting packages from the input end toward the discharge end. The transport mechanism is configured to impart a lateral shift to packages on the conveyor segment in a direction from a first side edge toward a second side edge of the conveyor segment. One or more of the alignment members each forms a respective window to allow lateral shifting of packages across adjacent conveyor lanes. Each window has a uniquely defined height to the limit lateral shifting of packages across adjacent conveyor lanes based on a height of each package. Each of the conveyor lanes is thereby configured to deliver packages of a uniquely different size group at the discharge end of the conveyor segment. The packages in a conveyor lane are aligned against a respective alignment member.

According to a second aspect of the invention, a method is provided that comprises operating a conveyor segment having a plurality of alignment members positioned along the conveyor segment that divide the conveyor segment into a plurality of conveyor lanes. One or more of the alignment members each forms a respective window having a uniquely defined height. The method comprises receiving a first package having a first package height by a first conveyor lane and transporting the first package toward a discharge end of the conveyor segment while imparting a lateral shift to the first package. The first package thereby remains in the first conveyor lane and is pushed into alignment against a first alignment member adjacent to the first conveyor lane, the first alignment member defining a first window having a first window height that is lesser than the first package height. The method comprises delivering the first package by the first conveyor lane to the discharge end of the conveyor segment. The method also comprises receiving a second package by the first conveyor lane, the second package having a second package height lesser than the first package height, and transporting the second package toward the discharge end of the conveyor segment while imparting a lateral shift to the second package. The second package thereby is laterally shifted from the first conveyor lane to a second conveyor lane through the first window defined by the first alignment member, the first window height being greater than the second package height. The second package then remains in the second conveyor lane and is pushed into alignment against a second alignment member adjacent to the second conveyor lane. The method comprises delivering the second package by the second conveyor lane to the discharge end of the conveyor segment.

BRIEF DESCRIPTION OF THE DRAWINGS

The invention is shown in more detail by help of figures. The figures show preferred configurations and do not limit the scope of the invention.

DETAILED DESCRIPTION

In the following detailed description of the preferred embodiments, reference is made to the accompanying drawings that form a part hereof, and in which is shown by way of illustration, and not by way of limitation, a specific embodiment in which the invention may be practiced. It is to be understood that other embodiments may be utilized and that changes may be made without departing from the spirit and scope of the present invention.

The present disclosure relates to conveyor systems with multiple alignment members with windows sized for filtering packages based on size. The described embodiments may provide an efficient and low-cost nesting of packages. Furthermore, sorting of packages by size may enable packages to be handled by size amenable equipment.

Figure 1:
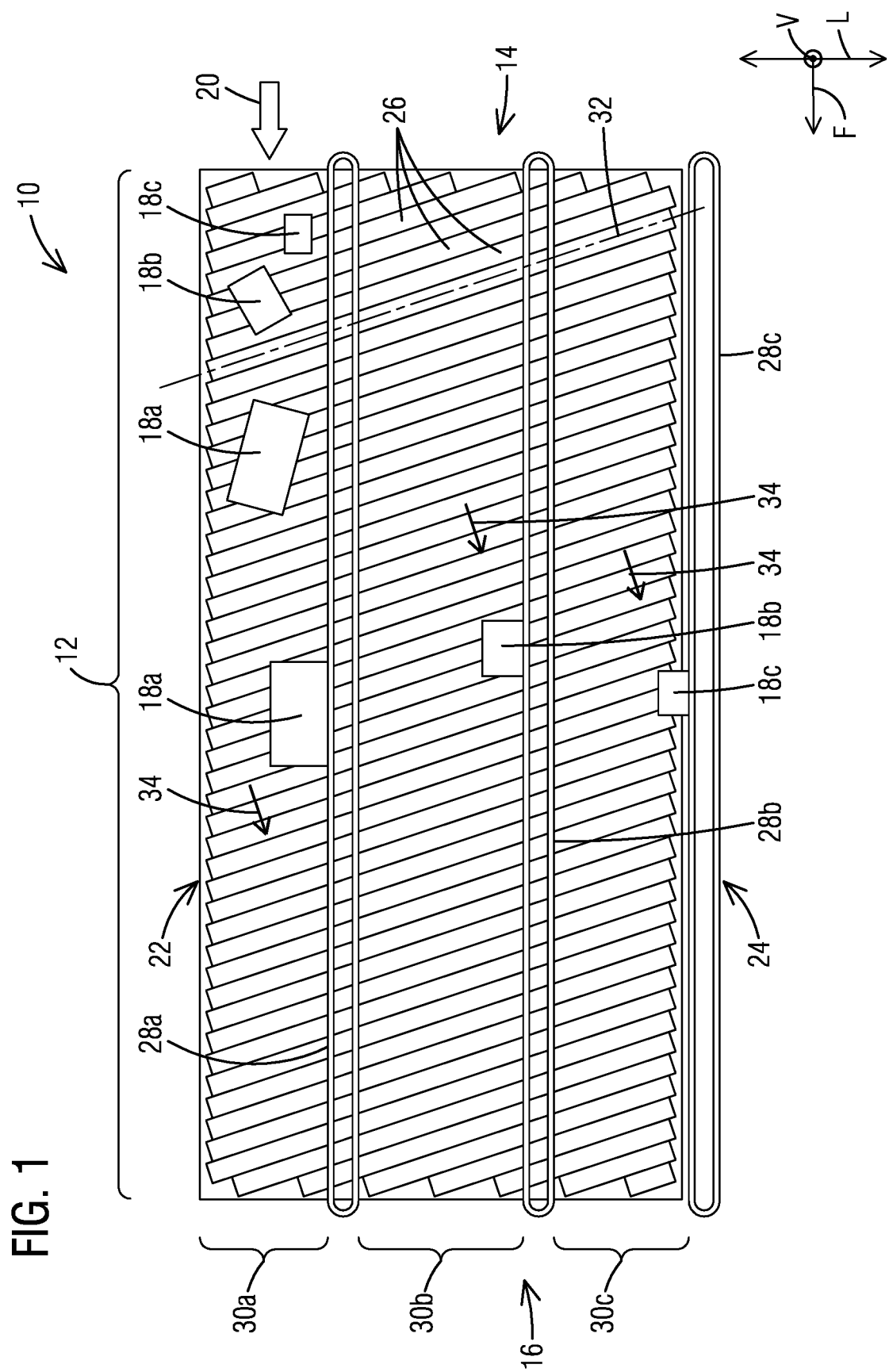
FIG. 1 is a plan view of an exemplary system comprising a conveyor segment with multiple alignment members.

Referring to FIG. 1, a portion of a system 10 is illustrated according to a non-limiting example embodiment. The system 10 may be incorporated, for example, in a parcel singulator. The system 10 may comprise at least one conveyor segment 12 having an input end 14 and a discharge end 16. The input end 14 may receive packages of various sizes, for example, from a bulk package feed, indicated as 20. For illustrative purposes, the packages have been referenced as 18a, 18b and 18c to denote three different size groups of packages. The discharge end 16 may feed into downstream equipment, not shown herein. In one non-limiting embodiment, such downstream equipment may include equipment for scanning barcodes, Radio Frequency Identification (RFID) tags, Near Field Communication (NFC) tags, and/or any other identifiers that have been affixed to the packages 18a-c. The packages 18a-c may comprise mail or parcel items packaged in envelopes, cardboard boxes, or other containers.

The conveyor segment 12 may extend laterally from a first side edge 22 to a second side edge 24. In this specification, the term "forward" refers to a direction of a transportation path which extends in a direction from the input end 14 to the discharge end 16. The transportation path may be linear, as shown in FIG. 1, or non-linear, for example, curved, or meandering, among others, or may comprise both linear and non-linear sections. The term "lateral", as used in this specification, refers to a direction normal to the forward direction at any point on the conveyor segment 12. The forward and lateral directions may be understood to be parallel to a conveyor surface. For the sake of illustration, reference is made in the drawings to mutually orthogonal axes F, L and V (shown in the drawings), which respectively denote the forward, lateral and vertical directions.

The conveyor segment 12 may comprise transport mechanism, in this case including rollers 26, for transporting packages 18a-c from the input end 14 to the discharge end 16. To this end, the rollers 26 may be passive or driven according to various embodiments. In other embodiments, transportation mechanism may comprise one or more belts, tilted tables, tracks and/or other suitable passive or driven mechanism instead of or in addition to rollers.

A plurality of alignment members 28a-c may be positioned along the conveyor segment 12. The alignment members 28a-c may extend parallel to the transportation path so as to divide the conveyor segment 12 into a plurality of conveyor lanes 30a-c. In general, the number of conveyor lanes 30a-c may be equal to the number of alignment members 28a-c, with each conveyor lane 30a, 30b, 30c being associated with a respective alignment member 28a, 28b, 28c.

The transport mechanism may be configured to move the packages 18a-c in the forward direction while imparting a lateral shift to the packages 18a-c. That is, the motion imparted to the packages 18a-c on the conveyor segment 12 may have components in the forward and lateral directions. In this context, the lateral shift may take place in a direction from the first side edge 22 toward the second side edge 24 of the conveyor segment 12. In the embodiment illustrated in FIG. 1, the transport mechanism comprises a set of rollers 26, each having a respective rotation axis 32 skewed with respect to the alignment members 28a-c, such that the rotational axes 32 of the rollers 26 are non-parallel and non-normal to the alignment members 28a-c. In this example, the axes 32 of the rollers 26 are parallel to each other. The rollers 26 may rotate in a direction indicated by the tangential arrow 34. As a result, when a package is on any of the conveyor lanes 30a, 30b, 30c, the rollers 26 may move the package toward the respective alignment member 28a, 28b, 26, in a direction normal to the rotation axes 32 (i.e., parallel to the arrow 34). In one embodiment, in order to facilitate unscrambling of the packages, the rollers 26 may comprise multiple roller sections driven at progressively greater speeds from the input end 14 to the discharge end 16. In a further embodiment, the transport mechanism may comprise multiple sets of rollers arranged laterally adjacent to each other. In this case, the rotational axes of rollers of laterally adjacent sets may be oriented at different angles to the alignment members, to form multiple herringbone sections. The alignment members may be positioned along some of the apex lines separating adjacent roller sets. In yet another embodiment, alternate to or in addition to using skewed rollers, one or more sets of conical rollers may be employed to achieve lateral shifting of the packages.

In accordance with the illustrated embodiment, the system 10 may be configured to sort the packages 18a-c based on size by selective filtering through the alignment members 28a-c. To this end, the alignment members 28a, 28b, 28c may each form a respective window to allow or prevent lateral shifting of packages across adjacent conveyor lanes based on the size of each package. The packages in each conveyor lane 30a, 30b, 30c may be aligned against a respective alignment member 28a, 28b, 28c as they are delivered to the discharge end 16. The present example embodiment depicts a three-level package sorting involving three alignment members. In other embodiments, a two-level or a higher than three-level package sorting may be achieved by using an appropriate number of alignment members for filtering the packages.

Figure 2:
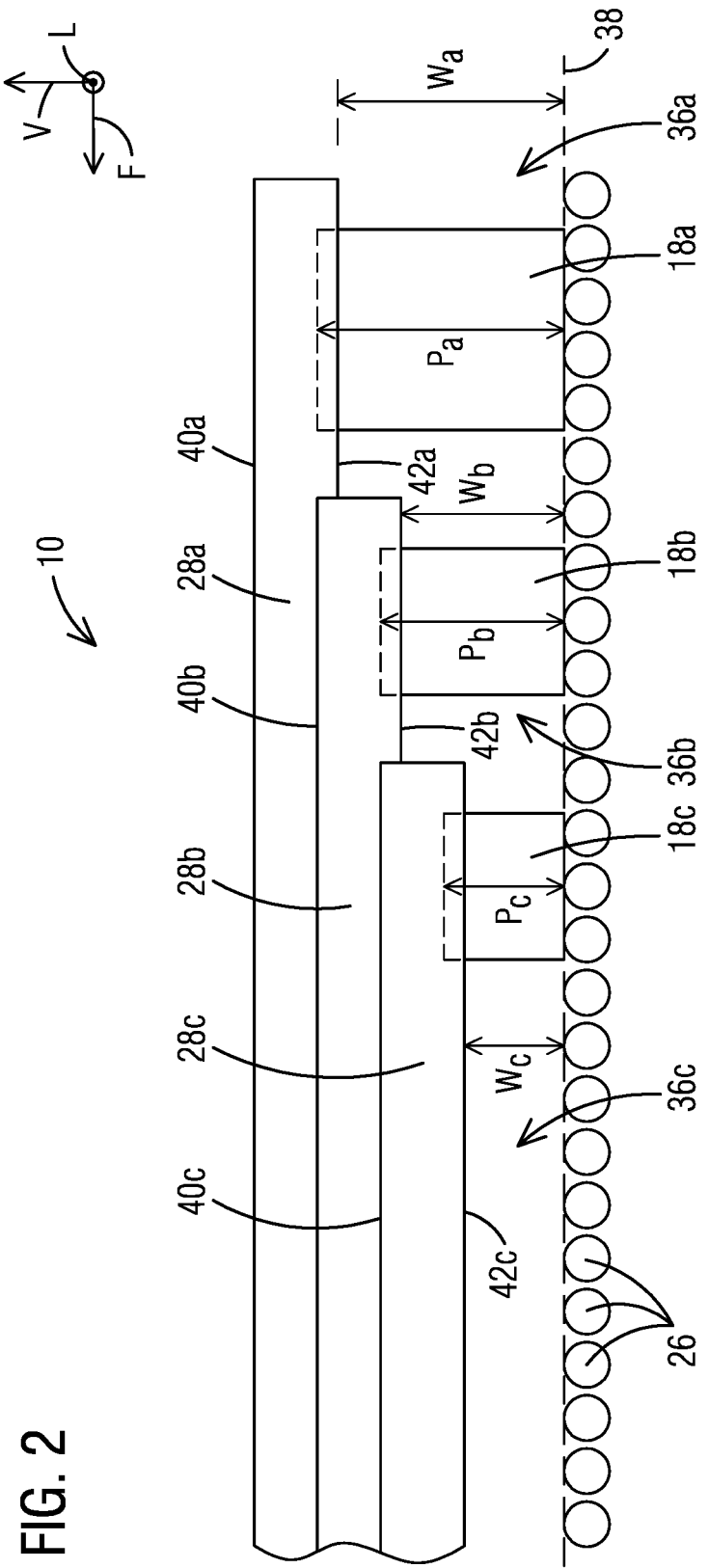
FIG. 2 is a schematic elevation view of the alignment members depicting windows for filtering packages based on size.

FIG. 2 is a schematic elevation view of the alignment members 28a, 28b, 28c, illustrating respective windows or clearances 36a, 36b, 36c above the conveyor surface 38. It should be noted that although shown to be having different lengths for the sake of illustration, the alignment members 28a-c may have substantially equal lengths, spanning the length of the conveyor segment 12, as shown in FIG. 1. It should also be noted that the position of packages 18a-c depicted in FIG. 2 is arbitrary and meant for illustrative purposes only. As shown in FIG. 2, the windows 36a, 36b, 36c have different heights designated as $W_a$, $W_b$, $W_c$ respectively. The packages 18a, 18b, 18c have respective heights $P_a$, $P_b$, $P_c$. The heights of $W_{a-c}$ of the windows 36a-c and the heights $P_a$, of the packages 18a-c may be measured vertically from a conveyor surface 38. In the present example, the conveyor surface 38 may be defined as an imaginary transportation surface that is tangential to the rollers 26 of the conveyor segment 12.

By defining a unique height $W_{a-c}$, for each window 36a-c it may be possible to the limit lateral shifting of the packages 18a-c across adjacent conveyor lanes based on a respective height $P_{a-c}$ of each package 18a-c. As a result, each conveyor lane 30a-c may deliver packages of a uniquely different size group at the discharge end 16 of the conveyor segment 12. In the context of this description, the size groups of packages may be defined in terms of the height of the packages measured vertically from the conveyor surface 38. In the illustrated example, packages may be sorted based on three uniquely different size groups. These size groups may comprise a first size group including packages having a height greater than the height $W_a$ of the first window 36a, a second size group including packages having a height intermediate to the height $W_a$ of the first window 36a and the height $W_b$ of the second window 36b, and a third size group including packages having a height intermediate to the height $W_b$ of the second window 36b and the height $W_c$ of the third window 36c. Packages belonging to first, second and third groups may be delivered at the discharge end 16 by the conveyor lanes 30a, 30b, 30c respectively. The illustrated system is amenable to an immediate vertical height of a package as delivered from the package feed 20.

The package orientation may be changed for sorting along other directions.

In the present embodiment, as shown in FIG. 1, the package feed 20 may be received at a first conveyor lane 30a positioned adjacent to the first side edge 22 of the conveyor segment 12. The alignment members 28a-c may be positioned such that the respective windows 36a-c are arranged in order of decreasing height $W_{a-c}$ in a direction from the first side edge 22 to the second side edge 24 of the conveyor segment 12. Thereby, packages may be sorted in decreasing order of size groups in a direction from the first side edge 22 to the second side edge 24 of the conveyor segment 12.

In one embodiment, the alignment members 28a-c may include belts. The belts 28a-c may be driven in a forward direction to push the aligned packages in a direction from the input end 14 toward the discharge end 16 of the conveyor segment 12. In one embodiment, each belt 28a-c may be driven at a forward velocity that is substantially equal to a forward velocity of an adjacent portion of the transportation surface 38. As shown in FIG. 2, the belts 28a-c may be oriented vertically, with each belt 28a, 28b, 28c comprising a respective upper edge 40a, 40b, 40c and a respective lower edge 42a, 42b, 42c. The lower edge 42a-c of each belt 28a-c may be spaced from the conveyor surface 38 to define the respective window 36a-c for the belt 28a-c. In particular, the lower edge lower edge 42a-c of each belt 28a-c may be arranged at a uniquely different elevation with respect to the conveyor surface 38 to define the height $W_{a-c}$ of the respective window 36a-c formed by the belt 28a-c. In an alternate embodiment, the alignment members may comprise stationary guard rails defining windows of varying clearances above the conveyor surface for filtering packages based on size.

Figure 3:
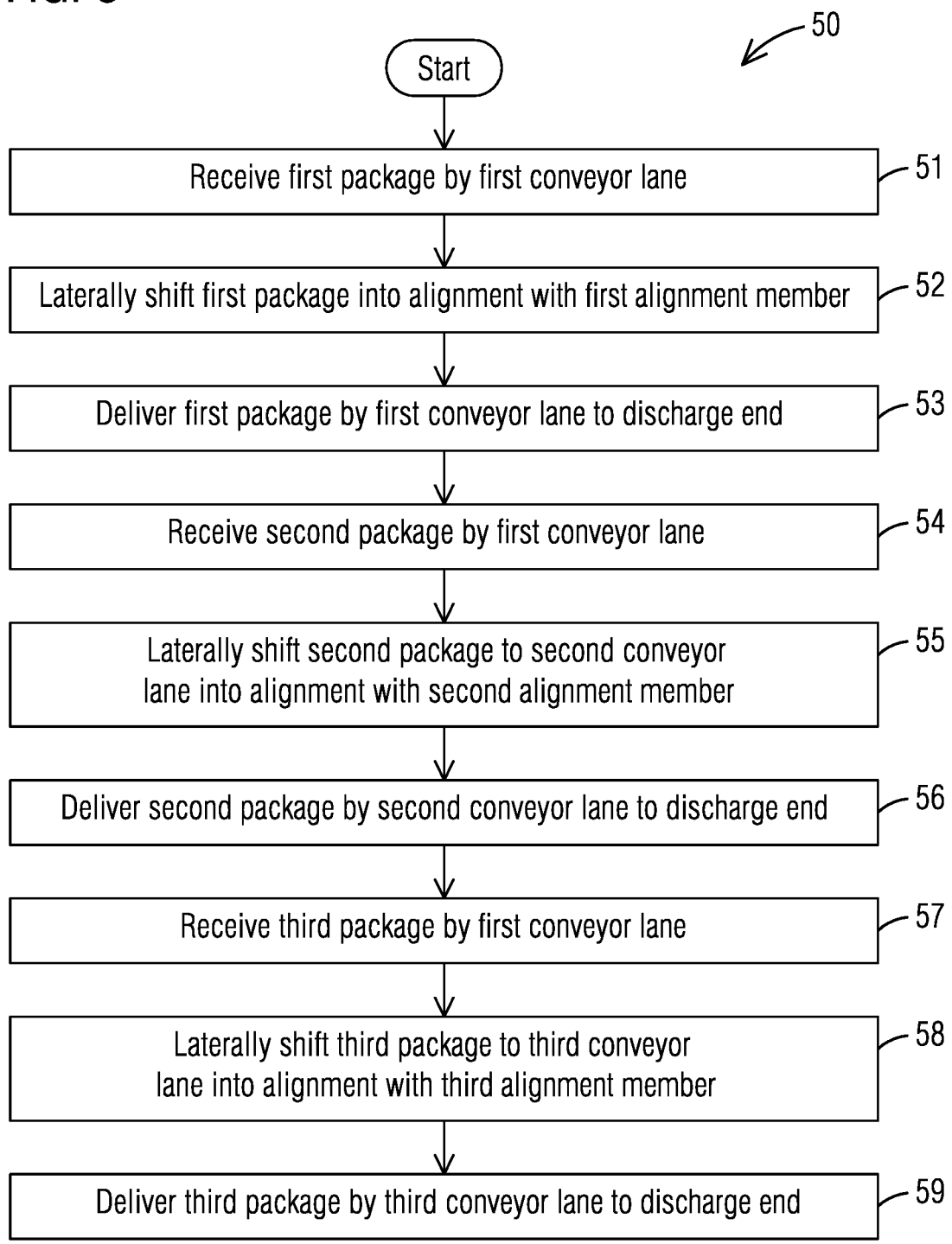
FIG. 3 is a flowchart illustrating an exemplary method for separating packages of different sizes.

FIG. 3 illustrates a method 50 for sorting of packages based on size by operating a system according to any of the above-described embodiments. The illustrated method 50 recites a specific sequence of handling a first package, a second package and a third package. However, the sequence is exemplary and not meant be construed as limiting. For example, the first, second and third packages may be handled in any order at any point in time, independent of each other, or may be handled concurrently by the conveyor segment. Furthermore, while the illustrated method 50 recites a three-level package sorting, it should be noted that the underlying concept could be applied in principle to any multi-level (i.e., including at least two levels) sorting of packages.

The method 50 is illustrated below referring to FIG. 3 in conjunction with FIGS. 1 and 2. Blocks 51 through 53 of the method 50 relate to handling of a first package 18a having a first package height $P_a$. Block 53 comprises receiving the first package 18a by the first conveyor lane 30a. Block 52 comprises transporting the first package 18a toward the discharge end 16 of the conveyor segment 12 while imparting a lateral shift to the first package 18a. In the illustrated embodiment, the first package 18a may be imparted a motion in a direction parallel to the arrow 34 in FIG. 1. As a result, the first package 18a is pushed into alignment against the first alignment member 28a adjacent to the first conveyor lane 30a. The first alignment member 28a defines a first window 36a having a first window height $W_a$ that is lesser than the first package height $P_a$. As a result, the first package 18a is prevented from shifting across to the second conveyor lane 30b and remains in the first conveyor lane 30a. Block 53 comprises delivering the first package 18a by the first conveyor lane 30a to the discharge end 16 of the conveyor segment 12.

Blocks 54 through 56 of the method 50 relate to handling of a second package 18b having a second package height $P_b$ lesser than the first package height $P_a$. Block 54 comprises receiving the second package 18b by the first conveyor lane 30a. Block 55 comprises transporting the second package 18b toward the discharge end 16 of the conveyor segment 12 while imparting a lateral shift to the second package 18b. In the illustrated embodiment, the second package 18b may be imparted a motion in a direction parallel to the arrow 34 in FIG. 1. As a result, the second package 18b is laterally shifted from the first conveyor lane 30a to a second conveyor lane 30b through the first window 36a defined by the first alignment member 28a, the first window height $W_a$ being greater than the second package height $P_b$. The second package 18b is further laterally pushed into alignment against the second alignment member 28b adjacent to the second conveyor lane 30b. The second package 18b thereby remains in the second conveyor lane 30b. Block 56 comprises delivering the second package 18b by the second conveyor lane 30b to the discharge end 16 of the conveyor segment 12.

Blocks 57 through 59 of the method 50 relate to handling of a third package 18c having a third package height $P_c$ lesser than the second package height $P_b$. Block 57 comprises receiving the third package 18c by the first conveyor lane 30a. Block 58 comprises transporting the third package 18c toward the discharge end 16 of the conveyor segment 12 while imparting a lateral shift to the third package 18c. In the illustrated embodiment, the third package 18c may be imparted a motion in a direction parallel to the arrow 34 in FIG. 1. As a result, the third package 18c is laterally shifted from the first conveyor lane 30a to the second conveyor lane 30b through the first window 36a defined by the first alignment member 28a. The third package 18c is furthermore laterally shifted from the second conveyor lane 30b to the third conveyor lane 30c through the second window 36b defined by the second alignment member 28b. This is because the second window height $W_b$ is greater than the third package height $P_c$ while being lesser than the second package height $P_b$. The third package 18c is further laterally pushed into alignment against the third alignment member 28c adjacent to the third conveyor lane 30b and remains in the third conveyor lane 30c. Block 59 comprises delivering the third package 18c by the third conveyor lane 30c to the discharge end 16 of the conveyor segment 12.

While specific embodiments have been described in detail, those with ordinary skill in the art will appreciate that various modifications and alternative to those details could be developed in light of the overall teachings of the disclosure. Accordingly, the particular arrangements disclosed are meant to be illustrative only and not limiting as to the scope of the invention, which is to be given the full breadth of the appended claims, and any and all equivalents thereof

The invention claimed is:

1. A system comprising:
a conveyor segment having an input end and a discharge end and comprising transport mechanism for transporting packages from the input end toward the discharge end,
a plurality of alignment belts positioned along the conveyor segment, dividing the conveyor segment into a plurality of conveyor lanes, the alignment belts being driven in a forward direction to push the aligned packages from the input end toward the discharge end, wherein individual alignment belts are laterally spaced to define a conveyor lane therebetween,
wherein the transport mechanism is configured to impart a lateral shift to packages on the conveyor segment in a direction from a first side edge toward a second side edge of the conveyor segment,
wherein one or more of the alignment belts each forms a respective window to allow lateral shifting of packages across adjacent conveyor lanes, each window having a uniquely defined height to the limit lateral shifting of packages across adjacent conveyor lanes based on a height of each package, and
wherein each of the conveyor lanes is configured to deliver packages of a uniquely different size group at the discharge end of the conveyor segment, the packages in a conveyor lane being aligned against a respective alignment belt.

2. The system according to claim 1, wherein each alignment belt comprises an upper edge and a lower edge, the lower edge being spaced from a conveyor surface to define the respective window for the belt.

3. The system according to claim 1, wherein each alignment belt is driven at a forward velocity that is substantially equal to a forward velocity of an adjacent portion of the conveyor surface.

4. The system according to claim 1, wherein the package feed is received at a first conveyor lane positioned adjacent to the first side edge of the conveyor segment.

5. The system according to claim 4, wherein the alignment belts are positioned such that the respective windows are arranged in order of decreasing height in a direction from the first side edge to the second side edge of the conveyor segment.

6. The system according to claim 1, wherein the transport mechanism comprises rollers having rotational axes that are non-parallel and non-normal to the alignment belts.

7. A method comprising:
operating a conveyor segment having a plurality of alignment belts positioned along the conveyor segment that divide the conveyor segment into a plurality of conveyor lanes, wherein one or more of the alignment belts each forms a respective window having a uniquely defined height, the alignment belts being driven in a forward direction to push the aligned packages from the input end toward the discharge end, wherein individual alignment belts are laterally spaced to define a conveyor lane therebetween,
receiving a first package by a first conveyor lane, the first package having a first package height,
transporting the first package toward a discharge end of the conveyor segment while imparting a lateral shift to the first package, such that:
the first package remains in the first conveyor lane and is pushed into alignment against a first alignment belt adjacent to the first conveyor lane, the first alignment belt defining a first window having a first window height that is lesser than the first package height,
delivering the first package by the first conveyor lane to the discharge end of the conveyor segment,
receiving a second package by the first conveyor lane, the second package having a second package height lesser than the first package height,
transporting the second package toward the discharge end of the conveyor segment while imparting a lateral shift to the second package, such that:
the second package is laterally shifted from the first conveyor lane to a second conveyor lane through the first window defined by the first alignment belt, the first window height being greater than the second package height, and
the second package remains in the second conveyor lane and is pushed into alignment against a second alignment belt adjacent to the second conveyor lane, and
delivering the second package by the second conveyor lane to the discharge end of the conveyor segment.

8. The method according to claim 7, comprising:
receiving a third package by the first conveyor lane, the third package having a third package height lesser than the second package height,
transporting the third package toward the discharge end of the conveyor segment while imparting a lateral shift to the third package, whereby
the third package is laterally shifted from the first conveyor lane to the second conveyor lane through the first window defined by the first alignment belt,
the third package is laterally shifted from the second conveyor lane to a third conveyor lane through a second window defined by the second alignment belt, the second window having a second window height that is greater than the third package height and lesser than the second package height,
the third package remains in the third conveyor lane and is pushed into alignment against a third alignment belt adjacent to the third conveyor lane, and
delivering the third package by the third conveyor lane to the discharge end of the conveyor segment.

9. The method according to claim 7, comprising driving each alignment belt at a forward velocity that is substantially equal to a forward velocity of an adjacent portion of a conveyor surface.

10. The method according to claim 7, comprising receiving a bulk package feed by the first conveyor lane, the first conveyor lane being positioned adjacent to a first side edge of the conveyor segment.

11. The system according to claim 10, wherein the alignment belts are positioned such that the respective windows are arranged in order of decreasing height in a direction from the first side edge to the second side edge of the conveyor segment, the method comprising delivering, the method comprising:
sorting packages in decreasing order of size groups in a direction from the first side edge to a second side edge of the conveyor segment.

12. The system according to claim 7, comprising transporting the packages across rollers having rotational axes that are non-parallel and non-normal to the alignment belts.

* * * * *